United States Patent
Maekawa et al.

(10) Patent No.: US 10,116,189 B2
(45) Date of Patent: Oct. 30, 2018

(54) ROTATING ELECTRICAL MACHINE EQUIPPED WITH ROTOR WITH OIL CONTAINERS

(71) Applicant: DENSO CORPORATION, Kariya, Aichi-pref. (JP)

(72) Inventors: Takeo Maekawa, Kariya (JP); Keiji Kondou, Kariya (JP); Masayoshi Yamamoto, Kariya (JP); Takashi Sato, Kariya (JP); Tomoyuki Shinkai, Kariya (JP)

(73) Assignee: DENSO CORPORATION, Kariya (JP)

( * ) Notice: Subject to any disclaimer, the term of this patent is extended or adjusted under 35 U.S.C. 154(b) by 319 days.

(21) Appl. No.: 15/006,215

(22) Filed: Jan. 26, 2016

(65) Prior Publication Data

US 2016/0218595 A1 Jul. 28, 2016

(30) Foreign Application Priority Data

Jan. 28, 2015 (JP) .................................. 2015-014310

(51) Int. Cl.
    *H02K 9/19* (2006.01)
    *H02K 5/04* (2006.01)
    *H02K 5/20* (2006.01)

(52) U.S. Cl.
    CPC ................. *H02K 9/19* (2013.01); *H02K 5/04* (2013.01); *H02K 5/20* (2013.01)

(58) Field of Classification Search
    CPC ........... H02K 9/19; H02K 9/193; H02K 9/197
    (Continued)

(56) References Cited

U.S. PATENT DOCUMENTS

| 2002/0130565 A1* | 9/2002 | Tilton | H02K 5/18 310/58 |
| 2013/0098585 A1* | 4/2013 | Franzen | H02K 9/193 165/104.31 |

(Continued)

FOREIGN PATENT DOCUMENTS

| JP | S52-123610 U | 9/1977 | |
| JP | 2003042273 A * | 2/2003 | ......... F16H 57/0427 |

(Continued)

OTHER PUBLICATIONS

Machine translation of JP 2010-060026 A.*
Machine translation of JP 2003-042273 A.*

*Primary Examiner* — John K Kim
*Assistant Examiner* — Minki Chang
(74) *Attorney, Agent, or Firm* — Oliff PLC

(57) ABSTRACT

A rotating electrical machine has a housing, a stator having a stator core and a rotor having a rotor core and rotor side plates rotatably supported by the housing. The rotor core is arranged to have a gap between the end surfaces of the rotor core and the stator. Oil containers are arranged on at least one surface of the rotor side plate. Each oil container has a scoop-up part and an exhaust outlet formed on end sections thereof. When the rotor is rotating, the scoop-up part scoops up an oil stored in the housing, the oil and inside air are compressed in the oil container, and the exhaust outlet exhausts the oil and compressed air to the coil end of the stator. The housing stores the oil at a lowermost side thereof so that the scoop-up part and the exhaust outlet are immersed in the oil.

13 Claims, 4 Drawing Sheets

(58) Field of Classification Search
USPC .............. 310/216.004, 400, 52, 54, 58, 60 R
See application file for complete search history.

(56) References Cited

U.S. PATENT DOCUMENTS

| | | | | |
|---|---|---|---|---|
| 2013/0334910 A1* | 12/2013 | Takahashi | ................ | H02K 9/22 |
| | | | | 310/52 |
| 2015/0207388 A1* | 7/2015 | Sugimoto | .............. | H02K 9/197 |
| | | | | 310/54 |
| 2017/0012501 A1* | 1/2017 | Sano | ........................ | H02K 9/19 |

FOREIGN PATENT DOCUMENTS

| JP | 2009-192024 A | | 8/2009 |
|---|---|---|---|
| JP | 2010060026 A | * | 3/2010 |
| JP | 2014-072921 A | | 4/2014 |
| JP | 2014-103722 A | | 6/2014 |

\* cited by examiner

ROTATING ELECTRICAL MACHINE EQUIPPED WITH ROTOR WITH OIL CONTAINERS

CROSS-REFERENCE TO RELATED APPLICATION

This application is related to and claims priority from Japanese Patent Application No. 2015-14310 filed on Jan. 28, 2015, the contents of which are hereby incorporated by reference.

BACKGROUND OF THE INVENTION

1. Field of the Invention

The present invention relates to rotating electrical machines equipped with a stator and a rotor capable of cooling a coil end of the stator and reducing a sliding loss, i.e. friction loss of the rotor.

2. Description of the Related Art

It is necessary to reduce a temperature of a stator in a rotating electrical machine, i.e. necessary to cool a coil end of a stator winding of a stator when the rotating electrical machine is rotating because a temperature of the stator winding of the stator rises due to an AC (alternating current) copper loss which is generated by a DC (direct current) copper loss and a leakage flux when electric power is supplied to the stator. For example, Patent document 1, Japanese patent laid open publication No. 2014-103722 discloses a technique for reducing a temperature of a stator in a rotating electrical machine.

The patent document 1 discloses the rotating electrical machine equipped with a housing, a rotor and a stator. The rotor has a rotor core and a rotor shaft. The rotor shaft of the rotor is rotatably supported by the housing. The rotor shaft has a lubricating fluid passage and a fluid exhaust outlet. Through the fluid discharge outlet the oil is discharged outside. The lubricating fluid passage is provided extending to a rotating axial direction of the rotor shaft of the rotor. Through the fluid exhaust outlet, fluid as a coolant flowing from the lubricating fluid passage is discharged to radially outside of the rotating axial direction. The rotor rotates around the rotor shaft in the housing. The stator is arranged at an outer peripheral side of the rotor in the housing. The stator has a stator core and a stator coil. The stator coil is wound on the stator core. The fluid exhaust outlet is open toward a coil end section which protrudes toward the axial direction of the core. The fluid exhaust outlet has an expanded section which is gradually expanded toward a radially outside of the fluid discharge outlet.

However, when the rotating electrical machine having the structure previously described is produced, it is necessary for the technique disclosed by the patent document 1 to use a complicated process in order to form an oil hole and an oil exhaust hole toward the coil end side. The oil enters the oil hole and flows in the lubricating fluid passage. Because the conventional technique further requires an oil supply pump, this increases a manufacturing cost. Further, because the rotating electrical machine having the structure disclosed by the patent document 1 has a relatively long distance which is measured from the oil exhaust hole to the coil end of the stator winding of the stator, the exhausted oil is scattered. This becomes difficult to exhaust the oil to a specific area with high accuracy.

SUMMARY

It is therefore desired to provide a rotating electrical machine capable of effectively exhausting an oil to a coil end of a stator with high accuracy and cooling the coil end of the stator with high efficiency.

An exemplary embodiment provides a rotating electrical machine. The rotating electrical machine has a housing, a stator and a rotor. The stator has a stator core. The stator core has a coil end. The stator is fixed to the housing. The coil end of the stator core protrudes toward an end surface of the stator. The rotor has a rotor core, a rotor shaft and a pair of rotor side plates. Both end surfaces of the rotor core are arranged between the rotor side plates. The rotor shaft of the rotor is rotatably supported by the housing. The rotor core has core sheets stacked in a direction of a rotary axis of the rotor shaft. The rotor core is arranged to have a specified gap between the end surfaces of the rotor core and the stator so as to rotate the rotor core around the stator while keeping the specific gap. In the rotating electrical machine, one or more oil containers are arranged on at least one surface of each of the rotor side plates. Each of the oil containers has a scoop-up part and an exhaust outlet which are formed at end sections of the oil container. When the rotor is rotating, the scoop-up part scoops up oil (as coolant) stored in the housing, the oil and inside air in the oil container are compressed, and the exhaust outlet of the oil container exhausts the oil with the compressed air to the coil end of the stator. The housing stores the oil at a lowermost side thereof so that the scoop-up part and the exhaust outlet in the oil container are immersed in the oil stored in the housing and the scoop-up part scoops up the oil when the rotor is rotating.

In the improved structure of the rotating electrical machine previously described, the oil containers are arranged on at least one of the rotor side plates and each of the oil containers has the scoop-up part and an exhaust outlet. The scoop-up part and an exhaust outlet are formed at end sections of the oil container. During the rotation of the rotor, the scoop-up part scoops up oil as coolant stored in the lowermost side of the housing. Inside air in the oil container is compressed by rotating force and centrifugal force when the rotor is rotating. The exhaust outlet of the oil container exhausts the oil with the compressed air outside, i.e. to the coil end of the stator.

This structure presses the air in the inside chamber of the oil container, and the compressed air is supplied to the oil to produce bubbles in the oil container. The generated bubbles enter into the gap between the rotor core and the stator core, and promote the oil attached on the rotor core from being separated from the surface of the rotor core. This makes it possible to reduce a sliding loss, i.e. friction loss of the rotor core. In addition, the oil does not spill from the oil containers because the oil container has a bag shape. This structure makes it possible to spray the oil stored in the oil container to the overall periphery of the coil end of the stator, and reduce a temperature of the coil end of the stator with high efficiency. Further, it is possible to spray the oil to the overall periphery of the coil end of the stator because the exhaust outlet of the oil container has a specific size which corresponds to the volume of the oil container. This structure makes it possible to perform stable cooling of the coil end of the stator. Still further, because the scoop-up parts and the exhaust outlets are arranged along the outer peripheral section on the surface of the rotor side plate, it is possible to discharge the oil stored at the outer-radially rear side in the oil container by a rotating force and centrifugal force with high efficiency when the rotor is rotating.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
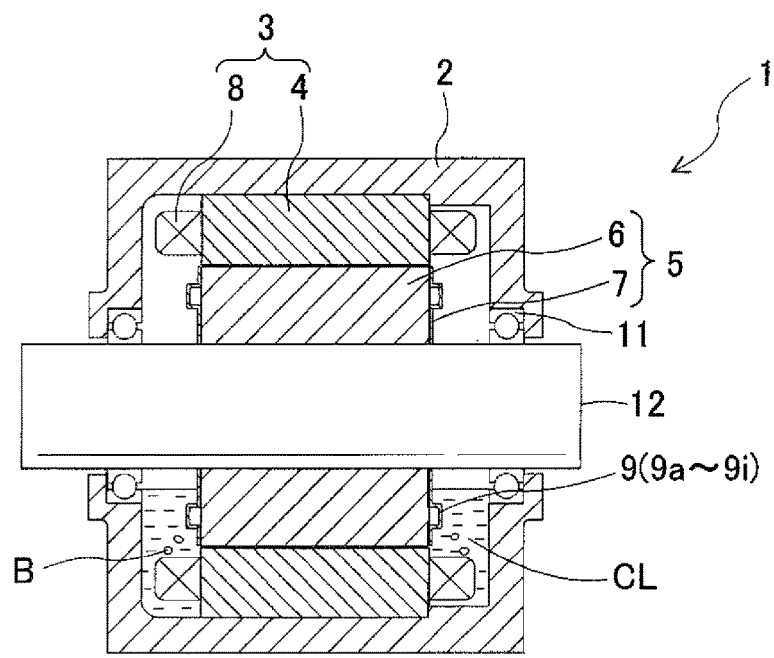
FIG. 1 is a view showing a schematically vertical cross section of a rotating electrical machine having oil containers 9 (9a to 9i) and a pair of rotor side plates 7 having an annular shape according to first to ninth exemplary embodiments of the present invention.

Hereinafter, various embodiments of the present invention will be described with reference to the accompanying drawings. In the following description of the various embodiments, like reference characters or numerals designate like or equivalent component parts throughout the several diagrams.

A description will be given of the rotating electrical machine 1 according to each of first to ninth exemplary embodiments with reference to the drawings.

FIG. 1 illustrates a schematically vertical cross section of the rotating electrical machine 1 according to the first to ninth exemplary embodiments. In particular, FIG. 1 illustrates oil containers 9 (9a to 9i) which are used in the rotating electrical machine according to the first to ninth exemplary embodiments. The rotating electrical machine 1 shown in FIG. 1 is used as an electrical motor and generator to be mounted on motor vehicles. The rotating electrical machine 1 is equipped with a stator 3 and a rotor 5. As shown in FIG. 1, the stator 3 is composed of a stator core 4 having a cylindrical shape and a stator winding. A plurality of stator slots is formed in the stator core 4. The stator winding is wound on the stator slots of the stator core 4. The stator 3 is fixed to the inner periphery of the housing 2. An oil CL is used as a coolant sealed in the inside of the chamber of the housing 2 and the oil CL is stored at a lowermost part of the housing 2. The stator winding is made of copper wires. The copper wires protrude from the end surface of the stator core 4 and are wound to form a coil end. The stator core 4 is made of magnetic material. For example, the stator core 4 is composed of core sheets made of electromagnetic steel sheets stacked in a rotating axis direction. The electromagnetic steel sheet is made of a thin silicon steel plate.

The rotor 5 has a rotor core 6, a pair of rotor side plates 7 and a rotor shaft 12. The rotor core 6 has a cylindrical shape. The rotor side plates 7 have an annular shape. The end surfaces of the rotor core 6 are fixed to and supported by the rotor side plates 7. The rotor shaft 12 is fixed to a rotating axis of the rotor core 6. The rotor 5 is rotatably supported by the housing 2 so that the rotor 5 faces with inside-hole surfaces of the stator core 4 at an equal gap. The rotor core 6 is made of electromagnetic material. For example, the rotor core 6 has the core sheets made of electromagnetic steel sheets stacked in a rotating axis direction. The electromagnetic steel sheet is made of a thin silicon steel plate. Permanent magnets are provided and fixed to or embedded in the outer peripheral side of the rotor core 6 at a specific interval corresponding to the thickness of the stator core 4.

As shown in FIG. 1, a plurality of the oil containers 9 (9a to 9i), which correspond to the first to ninth exemplary embodiments, is arranged along the outer peripheral side on the outside surface of each of the rotor side plates 7. The outside surface of the rotor side plate 7, on which the oil containers 9 (9a to 9i) are arranged, is opposite to the inner surface of the rotor side plate 7 which faces with the rotor core 6. The oil containers 9 (9a to 9i) and the rotor side plate 7 are assembled together, or the oil containers 9 (9a to 9i) are formed as separate components from the rotor side plate 7.

When the oil containers 9 (9a to 9i) and the rotor side plate 7 are formed with integrated, the oil containers 9 (9a to 9i) are embedded in the inside of the rotor side plate 7. That is, the oil containers 9 (9a to 9i) are provided in depressed sections formed in the rotor side plate 7. In this structure, each of the depressed section (in which the oil container is arranged) and the end surface of the rotor core 6 form an inside chamber.

Figure 10:
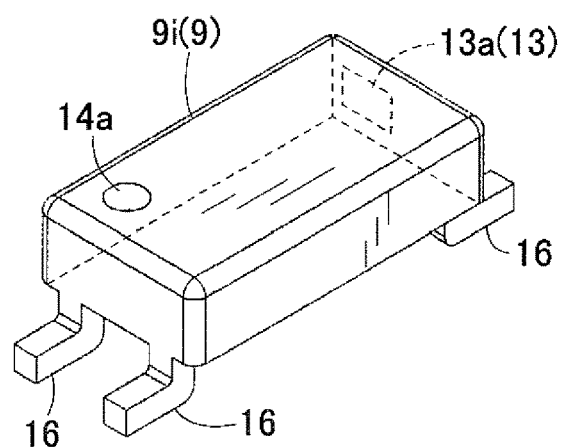
FIG. 10 is a perspective view showing an oil container 9i used in the rotating electrical machine according to the eighth exemplary embodiment of the present invention.

On the other hand, when each of the oil containers 9 (9a to 9i) is formed as a separate component from the rotor side plate 7, for example, see FIG. 10, the inner surface of each of the oil containers 9 (9a to 9i) and the end surface of the rotor core 6 form an inside chamber. The oil containers 9 (9a to 9i) are provided in both or one of the outside surface and the inner surface of each of the rotor side plates 7.

First Exemplary Embodiment

Figure 2:
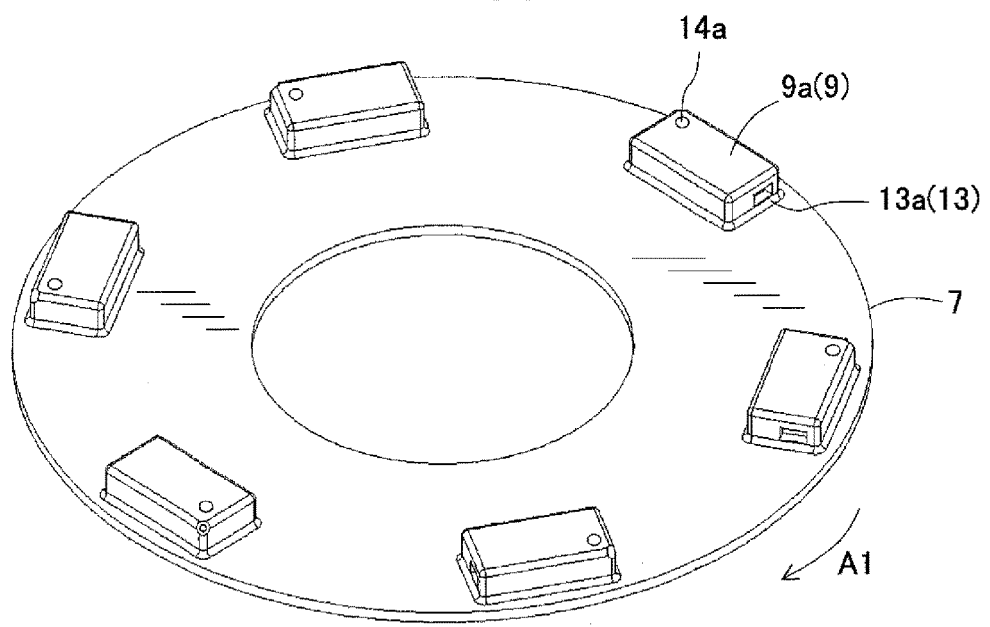
FIG. 2 is a perspective view showing oil containers 9a and the rotor side plate 7 having an annular shape in the rotating electrical machine according to the first exemplary embodiment of the present invention.

FIG. 2 illustrates a perspective view showing the oil containers 9a and the rotor side plate 7 having an annular shape in the rotating electrical machine 1 according to the first exemplary embodiment.

As illustrated in FIG. 2, each of the oil containers 9a has a rectangle shape. The oil containers 9a are arranged along a longitudinal direction thereof on the outer peripheral section of the rotor side plate 7. A scoop-up part 13a is formed at one short side surface of the oil container 9a. The scoop-up part 13a scoops up the oil CL when the rotor 5 is rotating. Further, an exhaust outlet 14a is formed on the upper surface of the oil container 9a, through which the oil CL and compressed air are forcedly discharged, i.e. exhausted together when the rotor 5 is rotating. The air in the oil container 9a is compressed in the inside chamber of the oil container 9a when the rotor 5 is rotating, and the oil CL and the compressed air are discharged and exhausted from the exhaust outlet 14a to the coil end 8 of the stator 3. That is, the exhaust outlet 14a acts as an exhaust nozzle from which the oil CL is exhausted to the coil end 8 of the stator 3 when the rotor 5 is rotating.

As illustrated in FIG. 2, the scoop-up part 13a and the exhaust outlet 14a are formed in each of the oil containers 9a to be close to the outer periphery of the rotor side plate 7.

The oil CL is stored at a lowermost side (or a bottom side) of the housing 2 so that the scoop-up part 13a and the exhaust outlet 14a in the oil container 9a are immersed in the oil CL when the oil container 9a moves to and reaches the lowermost part of the housing 2 during the rotation of the rotor side plates 7 of the rotor 5. The oil CL is made of insulating coolant such as transmission oil, oil pressure oil, etc.

The oil containers 9a are arranged at equal intervals on the outer peripheral section of the rotor side plate 7 so that the scoop-up part 13a of each of the oil containers 9a is open in a clockwise rotating direction (or forward rotating direction) as designated by the arrow A1 shown in FIG. 2. The scoop-up part 13a is formed on the short side surface of the oil container 9a at the outer peripheral side of the rotor side plate 7 so that the scoop-up part 13a of the oil container 9a is open toward the clockwise rotating direction A1.

On the other hand, the exhaust outlet 14a is formed on the upper surface of the oil container 9a at the rear side of the rotating direction A1, along the outer peripheral section of the rotor side plate 7. The exhaust outlet 14a acts as an exhaustion nozzle from which the oil CL stored in the oil container 9a is exhausted to the coil end 8 of the stator 3 when the rotor 5 is rotating.

This structure presses the air in the inside chamber of the oil container 9a, and the compressed air is supplied to the oil CL to produce bubbles B in the oil container 9a. The bubbles B enter into the gap between the rotor core 6 and the stator core 4, promote the oil attached on the rotor core 6 to be separated from the surface of the rotor core 6. This makes it possible to reduce a sliding loss, i.e. friction loss of the rotor core 6. In addition, the oil CL does not spill from the oil container 9a because of having a bag shape. This makes also it possible to spray the oil CL stored in the oil container 9a to the overall periphery of the coil end 8 of the stator 3, and perform cooling of the stator 3 with high efficiency. Further, it is possible to spray the oil CL to the overall periphery of the coil end 8 of the stator 5 because the exhaust outlet 14a of the oil container 9a has a specific size corresponding to the volume of the oil container 9a. That is, this structure makes it possible to perform stable cooling of the coil end 8 of the stator 5. Still further, because the scoop-up parts 13a and the exhaust outlets 14a are arranged along the outer peripheral section on the surface of the rotor side plate 7, it is possible to discharge the oil CL stored in the outer-radially rear side of the oil container 9a by a rotating force and centrifugal force with high efficiency when the rotor 5 is rotating.

Second Exemplary Embodiment

A description will be given of the rotating electrical machine according to the second exemplary embodiment with reference to FIG. 3.

Figure 3:
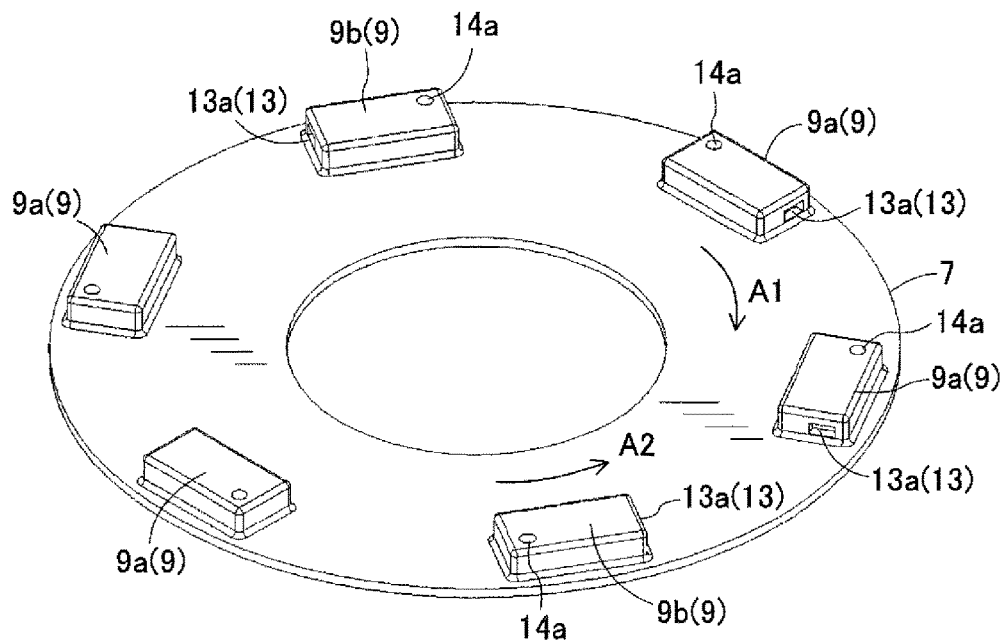
FIG. 3 is a perspective view showing the oil containers 9a, oil containers 9b and the rotor side plate 7 having an annular shape in the rotating electrical machine according to the second exemplary embodiment of the present invention.

FIG. 3 illustrates is a perspective view of the four oil containers 9a, two oil containers 9b and the rotor side plate 7 having an annular shape in the rotating electrical machine according to the second exemplary embodiment. As illustrated in FIG. 3, a pair of the two oil containers 9a is arranged at predetermined interval on the outer peripheral section on the surface of the rotor side plate 7 so that the scoop-up part 13a of each of the two oil containers 9a is open toward the clockwise direction of the rotor side plate 7, as designated by the arrow A1 illustrated in FIG. 3.

The oil container 9b is arranged, adjacently to the two oil containers 9a, on the outer peripheral section on the surface of the rotor side plate 7 so that the scoop-up part 13a of the oil container 9b is open toward the counter clockwise direction of the rotor side plate 7, as designated by the arrow A2 shown in FIG. 3.

Further, another pair of the two oil containers 9a are arranged, adjacently to the oil container 9b, at predetermined interval on the outer peripheral section on the surface of the rotor side plate 7 so that the scoop-up part 13a of each of the two oil containers 9a is open toward the clockwise direction A1 of the rotor side plate 7.

Still further, the oil container 9b is arranged, adjacently to the two oil containers 9a, on the outer peripheral section on the surface of the rotor side plate 7 so that the scoop-up part 13a of the oil container 9b is open toward the counter clockwise direction A2 of the rotor side plate 7.

That is, as shown in FIG. 3, the pair of the oil containers 9a and the oil container 9b are alternately arranged along the outer periphery of the rotor side plate 7, and the total number of the oil containers 9a is four and the total number of the oil containers 9b is two.

Although a ratio in number of the oil container between the oil containers 9a and the oil container 9b is 2:1, it is possible for the rotating electrical machine to have a specific ratio according to the magnitude of load of the rotating electrical machine. The scoop-up part 13a is formed along the clockwise direction A1 on the oil container 9a and at the outer periphery side of the rotor side plate 7. On the other hand, the scoop-up part 13a is formed along the counter clockwise direction A2 on the oil container 9b and at the outer periphery side of the rotor side plate 7. Further, as shown in FIG. 3, the discharge outlet 14 is formed on the upper rear side of the oil container 9a at the outer periphery side of the rotor side plate 7 along the clockwise direction A1 of the rotor side plate 7. On the other hand, the discharge outlet 14 is formed on the upper rear side of the oil container 9b at the outer periphery side of the rotor side plate 7 along the counter clockwise direction A2 of the rotor side plate 7.

Because the rotating electrical machine according to the second exemplary embodiment has the improved structure previously described, it is possible to use the rotating electrical machine according to the second exemplary embodiment as a bi-directional rotating electrical machine capable of rotating in the forward direction (in the clockwise direction A1) and the backward direction (in the counter clockwise direction A2) with the same behavior and effects of the rotating electrical machine according to the first exemplary embodiment.

Third Exemplary Embodiment

Figure 4:
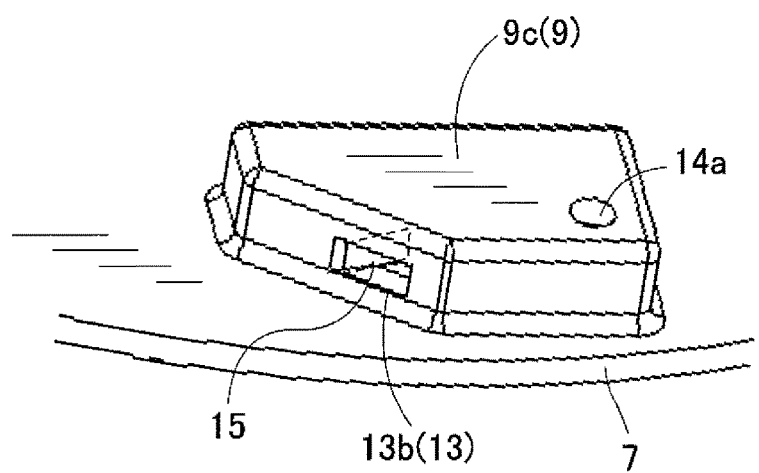
FIG. 4 is a perspective view showing an oil container 9c and the rotor side plate 7 having an annular shape in the rotating electrical machine according to the third exemplary embodiment of the present invention.

A description will be given of the rotating electrical machine according to the third exemplary embodiment with reference to FIG. 4. FIG. 4 is a perspective view showing an oil container 9c and the rotor side plate 7 having an annular shape in the rotating electrical machine according to the third exemplary embodiment. As shown in FIG. 4, the oil container 9c has a scoop-up part 13b with a cut-and-raised section 15. The cut-and-raised section 15 is produced by pressing and cutting a part of the side surface of the oil container 9c, and bending the part of the side surface inward. It is preferable for the oil container 9c to have the side surface which is formed by cutting a corner part of the rectangle shape shown in FIG. 4. FIG. 4 shows a structure of the oil container 9c having the five side surfaces.

The oil container 9c having the structure shown in FIG. 4 makes it possible to prevent occurrence of a backward flow of the oil CL in the oil container 9c, and increase an amount of the oil CL in the oil container 9c to be exhausted through the exhaust outlet 14a to the coil end 8 of the stator 3 with high efficiency. That is, the exhaust outlet 14a acts as an exhaust nozzle from which the oil CL is exhausted to the coil end 8 of the stator 3 when the rotor 5 is rotating. Further, because of producing the oil container 9c by press work or press molding work, it is possible to reduce a manufacturing cost of the oil container 9c as well as the rotating electrical machine.

Fourth Exemplary Embodiment

Figure 5:
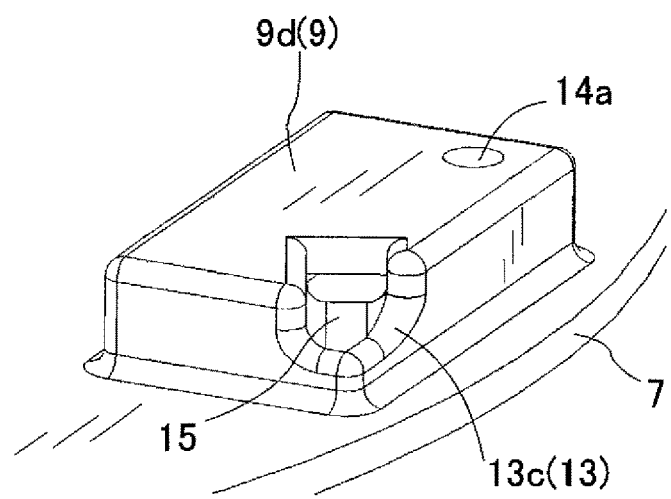
FIG. 5 is a perspective view showing an oil container 9d and the rotor side plate 7 having an annular shape in the rotating electrical machine according to the fourth exemplary embodiment of the present invention.

A description will be given of the rotating electrical machine according to the fourth exemplary embodiment with reference to FIG. 5. FIG. 5 is a perspective view showing an oil container 9d and the rotor side plate 7 having an annular shape in the rotating electrical machine according to the fourth exemplary embodiment.

As shown in FIG. 5, the oil container 9d has a scoop-up part 13c having a U shape formed on a corner of the oil container 9d so that an upper surface, a short side surface and a long side surface at the corner of the oil container 9d are joined together to form an opening section. Similar to the third exemplary embodiment previously described, it is possible to form the scoop-up part 13c by press work. In particular, the bottom part of the scoop-up part 13c having a U shape has the cut-and-raised section 15 shown in FIG. 5. The upper side of the scoop-up part 13c having the U shape is open, i.e. is the opening section of the oil container 9d.

This structure of the oil container 9d having the scoop-up part 13c makes it possible to easily supply the oil CL into the inside of the oil container 9d, and increase a total amount of the oil CL stored in the oil container 9d to be exhausted from the exhaust outlet 14a. That is, the exhaust outlet 14a acts as an exhaust nozzle from which the oil CL is exhausted to the coil end 8 of the stator 3 when the rotor 5 is rotating. This structure of the oil container 9d makes it possible to cool the coil end 8 of the stator 3 with high efficiency Further, because of producing the oil container 9d by press work or drawing press work, it is possible to reduce a manufacturing cost of the oil container 9d as well as the rotating electrical machine.

Fifth Exemplary Embodiment

Figure 6:
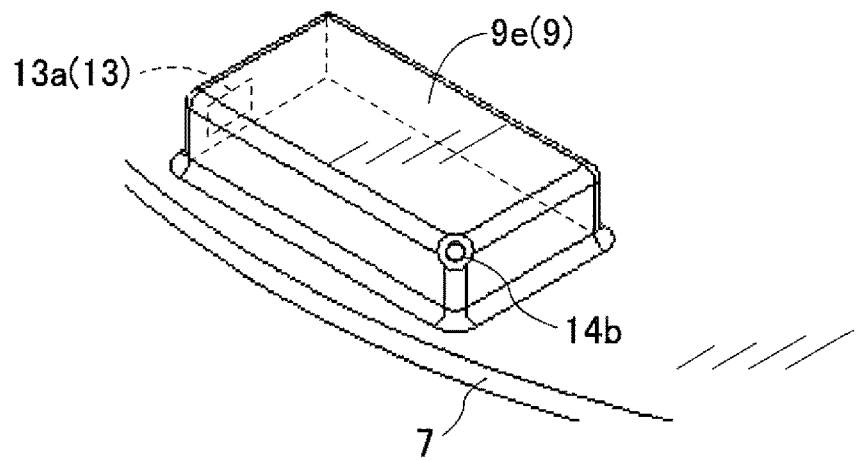
FIG. 6 is a perspective view showing an oil container 9e and the rotor side plate 7 having an annular shape in the rotating electrical machine according to the fifth exemplary embodiment of the present invention.

A description will be given of the rotating electrical machine according to the fifth exemplary embodiment with reference to FIG. 6. FIG. 6 is a perspective view showing an oil container 9e and the rotor side plate 7 having an annular shape in the rotating electrical machine according to the fifth exemplary embodiment.

As shown in FIG. 6, an exhaust outlet 14b is formed at a corner part of the oil container 9e having a flat rectangular shape. The scoop-up part 13a is formed on a short side surface of the oil container 9e. On the other hand, the exhaust outlet 14b is formed on a corner part which is close to the other short side surface of the oil container 9e. It is also acceptable to form the exhaust outlet 14b on a corner part at which a short side surface and a long side surface are joined together in the oil container 9e.

In a case in which the rotor side plate 7 and one or more oil containers 9e are assembled together by drawing work of a steel plate, i.e. drawing a steel plate, a hole is formed at a specific position on the steel plate, which corresponds to the corner part before performing the drawing work. This makes it possible to easily form a tapered hole at the corner part of the oil container 9e by the drawing work because a difference in extending between a front surface and a back surface of the steel plate is generated when the steel plate is bent. The tapered hole becomes the exhaust outlet 14b capable of radially exhausting the oil CL. This structure of the exhaust outlet 14b in the oil container 9e makes it possible to widely cool the coil end 8 of the stator 3 with high efficiency.

Sixth Exemplary Embodiment

Figure 7:
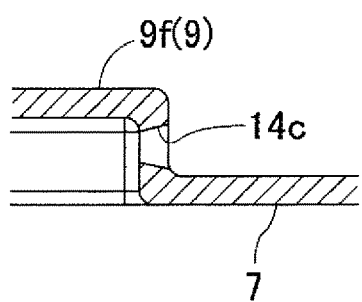
FIG. 7 is a view showing a cross section of an oil container 9f and the rotor side plate 7 having an annular shape in the rotating electrical machine according to the sixth exemplary embodiment of the present invention.

A description will be given of the rotating electrical machine according to the sixth exemplary embodiment with reference to FIG. 7. FIG. 7 is a view showing a cross section of an oil container 9f and the rotor side plate 7 having an annular shape in the rotating electrical machine according to the sixth exemplary embodiment.

As shown in FIG. 7, an exhaust outlet 14c has a taper shape which smoothly enlarges the cross sectional area of an opening from the inside to the outside of the exhaust outlet 14c. The exhaust outlet 14c is formed on the side surface of the oil container 9f.

Because the rotating electrical machine according to the sixth exemplary embodiment is equipped with the oil containers 9f having the specific structure previously described, it is possible for the exhaust outlet 14c formed in the oil containers 9f to act as an exhaust nozzle from which the oil CL is radially exhausted toward the coil end 8 of the stator 3 when the rotor 5 is rotating, and to enhance the cooling function capable of cooling the coil end 8 of the stator 3 when the rotor 5 is rotating.

Seventh Exemplary Embodiment

Figure 8:
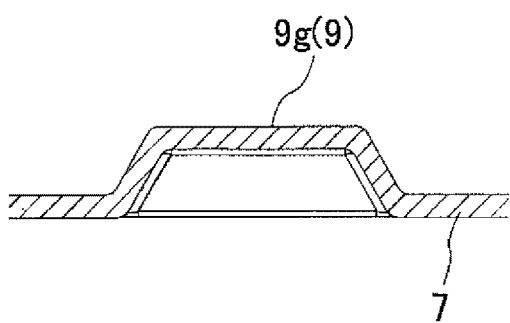
FIG. 8 is a view showing a cross section of an oil container 9g and the rotor side plate 7 having an annular shape in the rotating electrical machine according to the seventh exemplary embodiment of the present invention.
Figure 9:
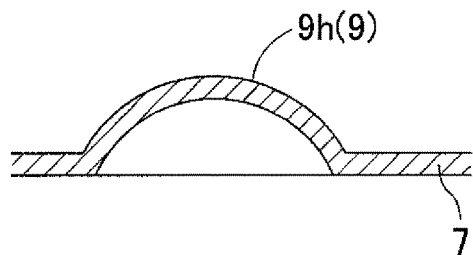
FIG. 9 is a view showing a cross section of an oil container 9h and the rotor side plate 7 having an annular shape in the rotating electrical machine according to a modification of the seventh exemplary embodiment of the present invention.

A description will be given of the rotating electrical machine according to the seventh exemplary embodiment with reference to FIG. 8 and FIG. 9. FIG. 8 is a view showing a cross section of an oil container 9g and the rotor side plate 7 having an annular shape in the rotating electrical machine according to the seventh exemplary embodiment. FIG. 9 is a view showing a cross section of an oil container 9h and the rotor side plate 7 having an annular shape in the rotating electrical machine according to a modification of the seventh exemplary embodiment.

As shown in FIG. 8, the oil container 9g has side surfaces. A cross section of the oil container 9g has a trapezoid shape. The cross section of the side surfaces of the oil containers 9g has a tapered shape. As shown in FIG. 9, the oil container 9h has side surfaces. A cross section of the oil container 9h has a semicircle shape. The cross section of the side surfaces of the oil containers 9g has a circular-tapered shape. It is also acceptable for the oil containers 9g and 9h to have a cross section of other shapes in addition to a tapered shape and a circular-tapered shape unless of having a slope shape.

As previously described, because a protruding part of each of the oil containers 9g and 9h used in the rotating electrical machine according to the seventh exemplary embodiment has a tapered shape, it is possible to reduce air resistance and oil resistance of the rotor 5 when the rotor 5 is rotating.

Eighth Exemplary Embodiment

A description will be given of the rotating electrical machine according to the eighth exemplary embodiment with reference to FIG. 10. FIG. 10 is a perspective view showing an oil container 9i used in the rotating electrical machine according to the eighth exemplary embodiment of the present invention.

As shown in FIG. 10, the oil container 9i is a separate component from the rotor side plate 7. The oil container 9i has four mounting sections 16 through which the oil container 9i is mounted on and fixed to the rotor side plate 7 by caulking or welding.

This structure of the rotating electrical machine according to the eighth exemplary embodiment having the oil containers 9i makes it possible to reduce the manufacturing cost.

Ninth Exemplary Embodiment

Figure 11:
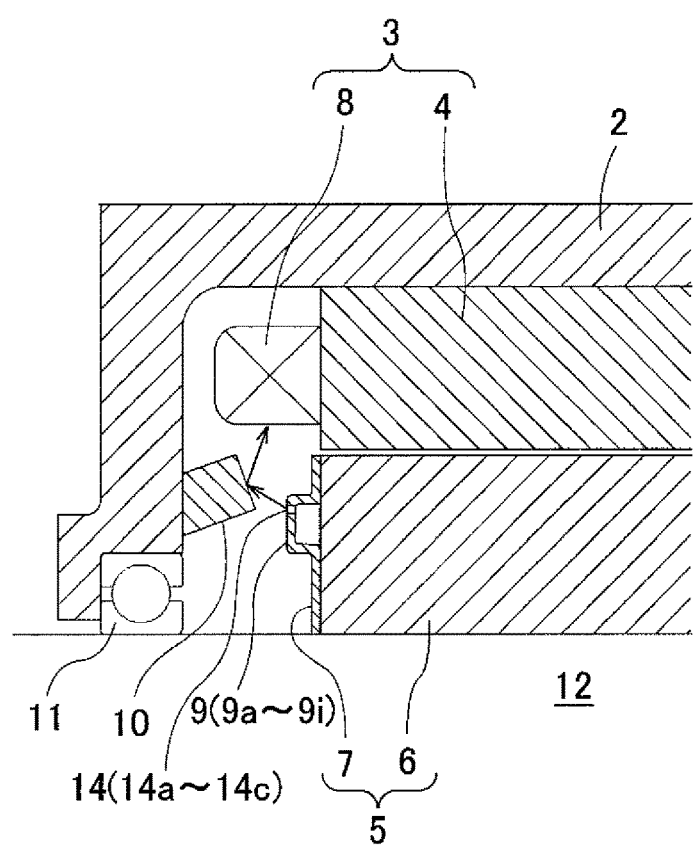
FIG. 11 is an enlarged sectional view of part of the rotating electrical machine equipped with a protruding section 10 according to the ninth exemplary embodiment of the present invention.

A description will be given of the rotating electrical machine according to the ninth exemplary embodiment with reference to FIG. 11. FIG. 11 is an enlarged sectional view of part of the rotating electrical machine equipped with a protruding section 10 according to the ninth exemplary embodiment.

As shown in FIG. 11, the protruding section 10 is formed and arranged at a specific position on an inner surface of the housing 2 so as to reduce a distance between the protruding section 10 and the coil end 8 and a distance between the protruding section 10 and the oil containers 9 (9a to 9i). The protruding section 10 has an annular shape. A front surface of the protruding section 10 has a specific angle so that the oil CL exhausted from the exhaust outlet 14 (14a to 14c) is deflected by the protruding section 10, and the deflected oil CL is supplied to the coil end 8 of the stator 3.

This structure of the rotating electric machine equipped with the housing having the protruding section 10 makes it possible to exhaust the oil CL to the coil end 8 of the stator with high accuracy and enhance the function to cool the end coil 8 of the stator 3 when the rotor 5 is rotating.

As can be clearly understood previously described in detail, the rotating electric machine according to the exemplary embodiments has the oil containers 9 (9a to 9i) arranged on one of or both the surfaces of the rotor side plate 7. Each of the oil containers 9 (9a to 9i) has the scoop-up part 13 (13a to 13c) and the exhaust outlet 14 (14a to 14c). The scoop-up part 13 (13a to 13c) scoops up the oil CL when the rotor 5 is rotating. The exhaust outlet 14 (14a to 14c) acts as an exhaust nozzle when the rotor 5 is rotating. Air in the inside of the oil containers 9 (9a to 9i) is compressed when the rotor 5 is rotating. That is, the oil CL and compressed air are exhausted together from the exhaust outlet 14 (14a to 14c) to the coil end 8 of the stator 3 when the rotor 5 is rotating. In particular, the oil CL is stored in the bottom side of the housing 2 so that the scoop-up part 13 (13a to 13c) and the exhaust outlet 14 (14a to 14c) are adequately immersed in the oil CL stored in the housing 2 when the scoop-up part 13 (13a to 13c) and the exhaust outlet 14 (14a to 14c) of the oil container 9 (9a to 9i) are moved to the bottom side of the housing 2.

Bubbles B are generated when the air in the oil containers 9 (9a to 9i) is compressed by the oil pressure and the compressed air is supplied to the oil CL in the oil containers 9 (9a to 9i). The generated bubbles B enter into the gap between the rotor core 6 and the stator core 4, and prevents the oil on the rotor core 6 from being accumulated. This reduces the sliding loss, i.e. friction loss caused by the oil CL adhered on the rotor core 6. Further, because the oil container 9 (9a to 9i) has a bag structure to store the oil CL therein, it is difficult to flow out the oil CL stored in the oil container 9 (9a to 9i) to exhaust, and allow to exhaust a predetermined amount of the oil CL toward the overall periphery of the coil end 8 of the stator 3 with high efficiency when the rotor 5 is rotating. This structure makes it possible to cool the coil end 8 of the stator 3 with high efficiency. Still further, it is possible to exhaust or spray the oil CL to the overall periphery of the coil end 8 of the stator 3 because of adjusting the size of the exhaust outlet 14 (14a to 14c) according to the volume of the oil container 9 (9a to 9i). This makes it possible to provide an excellent effect of stably cooling the winding of the stator 3.

Still further, the oil container 9 (9a to 9i) is arranged at the outer peripheral end section of the rotor side plate 7 which is rotating in one direction (for example, the clockwise direction). The scoop-up part 13 (13a to 13c) is formed at one end section (i.e. a short side surface) of the oil container 9 (9a to 9i) and opens toward the rotating direction of the rotor side plate 7. The exhaust outlet 14 (14a to 14c) is formed at the other end section of the oil container 9 (9a to 9i) and at the outer peripheral side of the rotor side plate 7. This structure makes it possible to exhaust all of the oil CL, which is stored by rotating force and centrifugal force in the radially outside section of the oil container 9 (9a to 9i) and at the rear side of the oil container 9 (9a to 9i) in the rotating direction of the rotor 5.

Still further, the rotating electrical machine according to one exemplary embodiment has the improved structure in which the oil containers 9a are arranged for the scoop-up part 13 thereof to be open in the forward rotating direction (in the clockwise direction, for example) of the rotor side plate 7 and the oil containers 9b are arranged for the scoop-up part 13 thereof to be open in the backward direction (in the reverse direction or the coulter clockwise direction, for example) of the rotor side plate 7. The ratio in number of the oil containers 9a and the oil containers 9b is a specific ratio. The scoop-up part 13 is arranged on one side surface of the oil container 9a and the exhaust outlet 14a is arranged on the other end surface of the oil container 9a. Still further, the oil containers 9a and 9b are arranged on the rotor side plate 7 so that the scoop-up part 13 and the exhaust outlet 14a in each of the oil containers 9a and 9b are arranged at the outer peripheral side of the rotor side plate 7. This structure makes it possible to exhaust the oil CL toward the coil end 8 of the stator 3 even if the rotor 5 is rotating in the clockwise direction and coulter clockwise direction, where the oil CL is stored at the radially outside of the oil containers 9a and 9b in the rotating direction by the rotating force and centrifugal force when the rotor 5 is rotating.

Because the scoop-up part 13 has the cut-and-raised section 15, the formation of the cut-and-raised section 15 prevents backflow of the oil CL stored in the oil container 9 (9a to 9i), and increases the total amount of the oil CL to be exhausted from the exhaust outlet 14a to the coil end 8 of the stator 3. This structure makes it possible to cool the coil end 8 of the stator 3 with high efficiency. Still further, because the oil containers 9c having the structure previously described are produced by press work, it is possible to reduce the manufacturing cost of the rotating electrical machine.

Still further, because the scoop-up part 13c in the oil container 9d has a U shape and is formed on a corner part of the oil container 9d so that an upper surface, a short side surface and a long side surface at the corner of the oil container 9d are joined together. This structure of the scoop-up part 13c makes it possible to easily introduce the oil CL into the inside chamber of the oil container 9d, and increase the total amount of the oil CL to be exhausted from the exhaust outlet 14a to the coil end 8 of the stator 3. As a result, this structure makes it possible to cool the coil end 8 of the stator 3 with high efficiency. Because the scoop-up part 13c in the oil container 9d can be produced by press work, it is possible to reduce the manufacturing cost of the rotating electrical machine.

Still further, the exhaust outlets 14a to 14c are formed at an upper part, a corner part or a side surface of the oil container 9 (9a to 9i) which is an opposite part of the part at which the scoop-up part 13 (13a to 13c) of the oil container 9 (9a to 9i) is formed. This structure makes it possible to exhaust the bubble B from the exhaust outlet 14a, which is closer to the coil end 8 of the stator 3, and improve the cooling function of the rotating electrical machine.

In addition, because the exhaust outlet 14c has a taper shape which smoothly increases the cross sectional area of the opening from the inside to the outside of the exhaust outlet 14c, it is possible for the exhaust outlet 14c to exhaust the oil CL to the overall area of the coil end 8 and enhance the cooling function to cool the coil end 8 of the stator 3.

Still further, because the oil container 9g or 9h has a side surface having a slope, it is possible to reduce air resistance and oil resistance of the rotor 5 when the rotor 5 is rotating.

Furthermore, because each of the oil containers 9i is a separate component from the rotor side plate 7. That is, the oil containers 9i and the rotor side plate 7 are produced independently, and the oil containers 9i and the rotor side plate 7 are assembled together. The oil container 9i has four mounting sections 16 through which the oil container 9i is mounted on and fixed to the rotor side plate 7 by caulking or welding. It is possible to produce the oil containers 9i at low production cost.

In addition, because the housing 2 has the protruding section 10 arranged at a specific position on the inner surface of the housing 2 so as to reduce a distance between the protruding section 10 and the coil end 8 of the stator 3 and a distance between the protruding section 10 and the oil containers 9 (9a to 9i). The oil CL exhausted from the exhaust outlet 14 (14a to 14c) is deflected firstly by the protruding section 10 and the deflected oil CL is supplied to the coil end 8 of the stator 3 with high efficiency. This structure of the rotating electric machine equipped with the protruding section 10 makes it possible to supply the oil CL to the coil end 8 of the stator 3 with high accuracy, and enhance the function to reduce a temperature of the coil end 8 of the stator 3 when the rotor 5 is rotating.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A rotating electrical machine comprising:
   a housing:
   a stator comprising a stator core, the stator core comprising a coil end, the stator being fixed to the housing, the coil end of the stator core protruding toward an end surface of the stator; and
   a rotor comprising a rotor core, a rotor shaft and a pair of rotor side plates, both end surfaces of the rotor core being arranged between the rotor side plates, the rotor shaft of the rotor being rotatably supported by the housing, the rotor core comprising core sheets stacked in a direction of a rotary axis of the rotor shaft, the rotor core being arranged to have a specified gap between the end surfaces of the rotor core and the stator so as to rotate the rotor core around the stator while keeping the specific gap,
   wherein one or more oil containers are arranged on at least one surface of each of the rotor side plates, each of the oil containers comprises a scoop-up part and an exhaust outlet formed at end sections of the oil container,
   when the rotor is rotating, the scoop-up part of each of the oil containers scoops up an oil stored in the housing, inside air in the oil container are compressed, and the exhaust outlet of the oil container exhausts the oil and the compressed air together, and
   the oil is stored in a lowermost side of the housing so that the scoop-up part and the exhaust outlet in each of the oil containers are immersed and the scoop-up part of each of the oil containers scoops up the oil in the lowermost side of the housing when the rotor is rotating, and
   the scoop-up part in each of the oil containers has a U shape formed at a corner of the oil container so that an upper surface, a short side surface and a long side surface at the corner of the oil container are connected together.

2. The rotating electrical machine according to claim 1, wherein the scoop-up part is formed on one end side of the oil container and on an outer peripheral part of the rotor side plate so that the scoop-up part is open toward a rotation direction of the rotor side plates, and the exhaust outlet is formed at the other side of the oil container on the outer peripheral part of the rotor side plate.

3. The rotating electrical machine according to claim 2, wherein the scoop-up part formed in each of the oil containers comprises a cut-and-raised section formed by cutting and raising the side surface of the oil container.

4. The rotating electrical machine according to claim 2, wherein each of the exhaust outlets is formed at an upper part, a corner part or a side surface of the oil container, which is opposite in position to the scoop-up part of the oil container, and the exhaust outlets are arranged at the outer peripheral part of the rotor side plate.

5. The rotating electrical machine according to claim 1, wherein the oil containers are divided into a first group and a second group, the oil containers belonging to the first group are arranged on the outer peripheral part of the rotor side plate so that the scoop-up part of each of the oil containers is open to a clockwise direction of the rotor side plate, and the oil containers belonging to the second group are arranged on the outer peripheral part of the rotor side plate so that the scoop-up part of each of the oil containers is open to a counter-clockwise direction of the rotor side plate, and a ratio in number between the oil containers belonging to the first group and the oil containers belonging to the second group is a predetermined ratio, wherein the scoop-up part and the exhaust outlet formed in each of the oil containers are arranged at the outer peripheral side of the rotor side plate.

6. The rotating electrical machine according to claim 5, wherein the scoop-up part formed in each of the oil containers comprises a cut-and-raised section formed by cutting and raising the side surface of the oil container.

7. The rotating electrical machine according to claim 5, wherein each of the exhaust outlets is formed at an upper part, a corner part or a side surface of the oil container, which is opposite in position to the scoop-up part of the oil container, and the exhaust outlets are arranged at the outer peripheral part of the rotor side plate.

8. The rotating electrical machine according to claim 1, wherein the scoop-up part formed in each of the oil containers comprises a cut-and-raised section formed by cutting and raising the side surface of the oil container.

9. The rotating electrical machine according to claim 1, wherein each of the exhaust outlets is formed at an upper part, a corner part or a side surface of the oil container, which is opposite in position to the scoop-up part of the oil container, and the exhaust outlets are arranged at the outer peripheral part of the rotor side plate.

10. The rotating electrical machine according to claim 1, wherein the exhaust outlet formed in each of the oil containers has a taper shape in which the cross sectional area of the opening is smoothly enlarged from the inside to the outside of the exhaust outlet.

11. The rotating electrical machine according to claim 1, wherein each of the oil containers has a side surface having a slope.

12. The rotating electrical machine according to claim 1, wherein each of the oil containers is separated in component from the rotor side plates, and each of the oil containers comprises mounting sections through which the oil container is mounted on and fixed to the rotor side plate.

13. The rotating electrical machine according to claim 1, wherein the housing comprises a protruding section which is arranged at a specific position on the inner surface of the housing, and the protruding section deflects the oil exhausted from the exhaust outlet of each of the oil containers.

* * * * *